Figure 1:
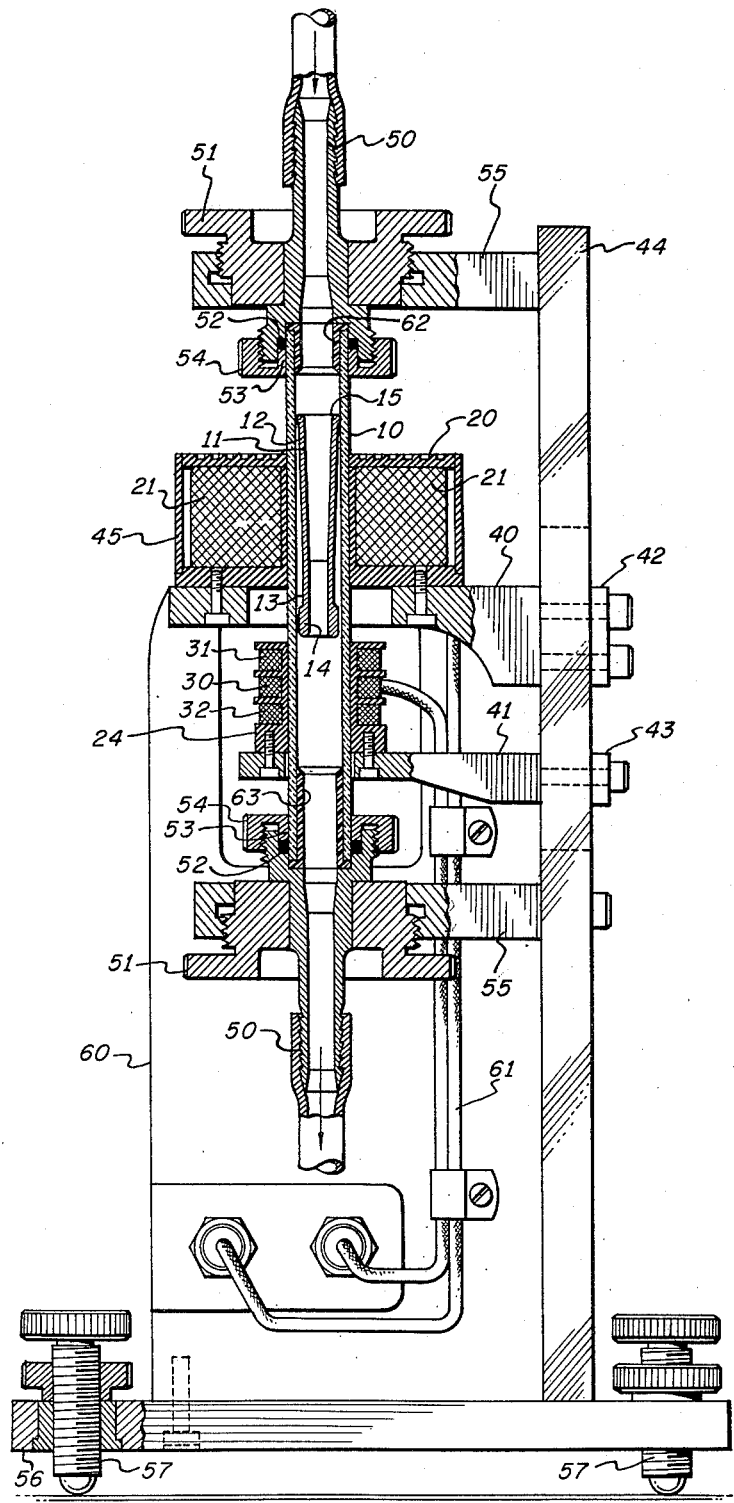

March 19, 1963   R. E. CLAUSS ET AL   3,081,629
PRECISION FLUID FLOW MEASURING AND CONTROLLING APPARATUS
Filed Aug. 22, 1960   2 Sheets-Sheet 1

INVENTORS
RAYMOND E. CLAUSS
EDWARD R. HUMBERT
WILLIAM F. JORCH
BY
ATTORNEY

United States Patent Office 3,081,629
Patented Mar. 19, 1963

3,081,629
PRECISION FLUID FLOW MEASURING AND CONTROLLING APPARATUS
Raymond E. Clauss, New Hyde Park, Edward R. Humbert, Rockville Centre, and William F. Jorch, Huntington, N.Y., assignors to Sperry Rand Corporation, Great Neck, N.Y., a corporation of Delaware
Filed Aug. 22, 1960, Ser. No. 51,210
1 Claim. (Cl. 73—205)

This invention relates to apparatus for measuring and controlling fluid flow and particularly to apparatus for measuring and controlling fluid flow precisely and rapidly.

The present invention may be utilized, for example, to measure the flow of blood when a patient is undergoing an operation wherein the flow rate must be measured and controlled precisely in order that small variations in flow rate are indicated rapidly and accurately for obvious reasons.

Known flow measuring apparatus of this type, particularly, for measuring the flow of blood is disclosed in an article entitled "A Magnetic Flowmeter for Recording Cardiac Output" written by Shirer, Shackelford and Jochim and published in the November 1959 issue of the Proceedings of the IRE on pages 1901 through 1912. Generally, the apparatus disclosed in the above article requires the use of electrodes and/or complex electronic equipment, both of which are undesirable.

It is a primary object of the present invention to provide flow measuring and controlling apparatus which is simple, extremely accurate, very sensitive to small changes in flow rate and thoroughly reliable.

It is an additional object of the present invention to provide flow measuring apparatus in which the operation of the apparatus does not disturb the composition of the fluid being measured wherein if the apparatus is rendered inoperative it does not impair the fluid flow.

It is an additional object of the present invention to provide flow measuring apparatus in which the range of fluid flow rates to be measured may be readily varied without impairing the fluid flow.

These and other objects are achieved by the present invention in which a hollow, tubular, tapered, magnetic float is suspended by means of an electromagnetic biasing coil within a hollow glass conduit through which the fluid to be measured flows. The flow of fluid displaces the float and this displacement is measured by a pick-off coil cooperative with a portion of the float. The pick-off coil provides a signal representative of the movement of the float which is proportional to flow rate. This signal is connected to an indicator for providing a precise indication of the rate of flow of the fluid. The flow rate signal may also be connected as a control signal to fluid flow control apparatus for controlling the flow rate of the fluid.

The apparatus may be made responsive to provide an indication within a predetermined range of fluid flow rates by varying the magnetic bias provided by the electromagnetic biasing coil.

Figure 2:
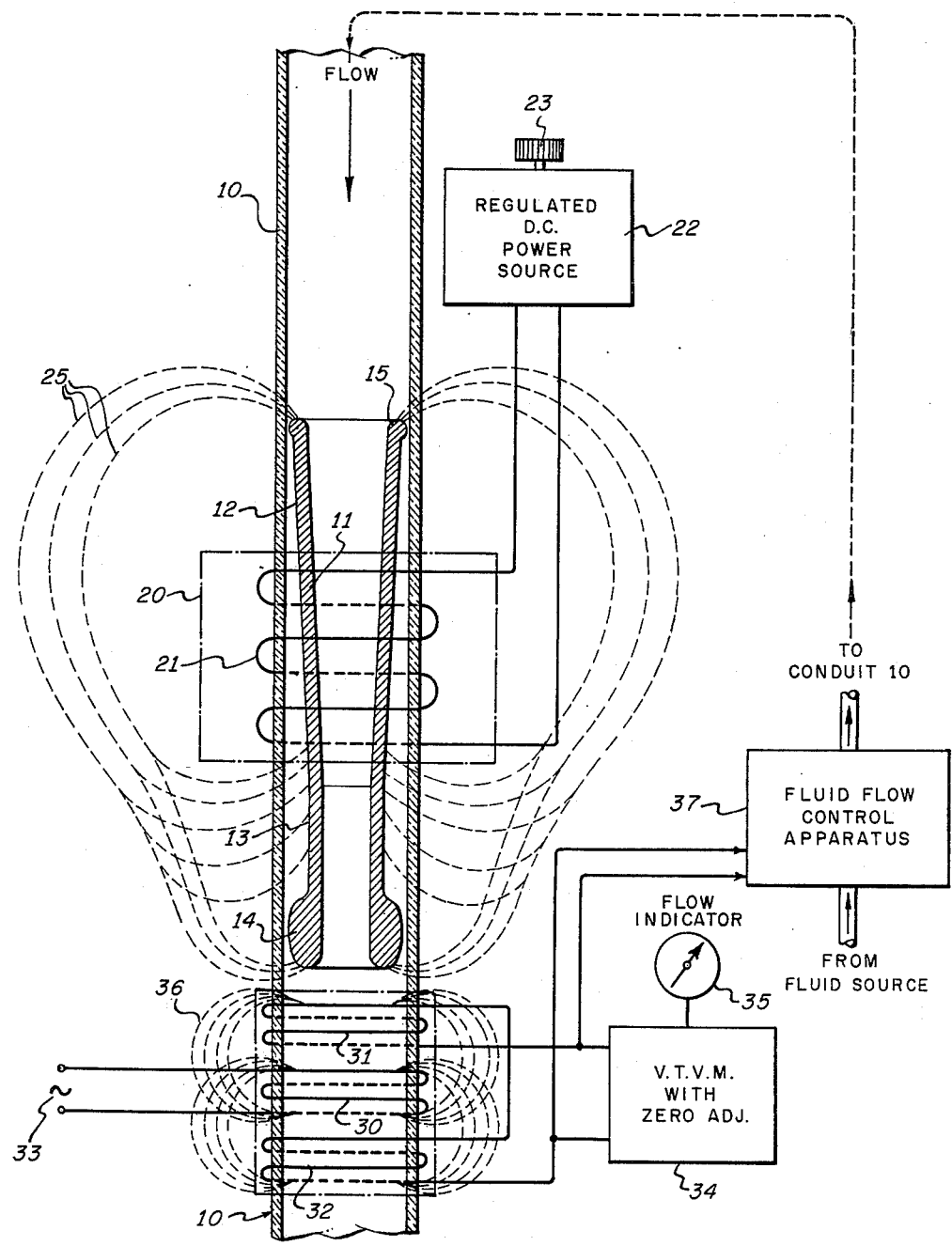

Further objects will appear from the following specification and claim when read in conjunction with the drawings in which:

FIG. 1 is a sectional elevation of a flowmeter embodying the present invention; and FIG. 2 is an enlarged view of the float and the pick-off of FIG. 1 showing the circuitry and apparatus associated therewith in schematic form.

The present invention will be described as applied to a flowmeter of the type utilized for measuring and controlling the rate of flow of blood since this application is characteristic of a severe and critical environment requiring precision measurement without undesirably interfering with the fluid flow or changing the composition of the fluid. Although the invention will be described with respect to a flowmeter of this type, it will be appreciated that the principles of the invention are equally applicable to flowmeters measuring fluids in general, including gases or liquids. It is readily adapted to measure and control liquid fuel flow rates as well as air flow rates.

Further, the term "float" as used in this description is intended to connote an element that is effectively floated in a magnetic field but not necessarily buoyantly supported by means of the fluid in which it is submerged.

Referring to FIGS. 1 and 2, a non-magnetic electrically non-conductive conduit 10 through which the fluid to be measured flows is shown vertically disposed. The fluid flows in a downward direction as indicated by the arrow. Preferably, the conduit 10 is made of glass and has a non-wettable polished bore. A hollow tubular magnetic float 11 is positionably disposed for vertical movement within the conduit 10 and responsive to the fluid flow therethrough. The upper portion 12 of the float 11 is tapered in order that the flow of fluid provides a force acting on the tapered portion 12 of the float 11 which causes vertical displacement of the float 11 proportional to the flow rate. Preferably, the lower portion 13 of the float 11 has a uniform bore diameter. The tapered bore in the upper portion 12 of the float 11 enables it to respond to relatively small changes of flow rate while the uniform bore of the lower portion 13 permits unrestricted fluid flow if the apparatus is inoperative or malfunctioning.

As shown more clearly in FIG. 2, the lower extremity of the lower portion 13 of the float 11 has a peripheral projection 14 which functions as an armature in a manner to be explained and also adds greater weight to the base of the float 11 thereby making it pendulous. The upper extremity of the upper portion 12 has a rounded lip 15. Preferably, the outside diameters of the rounded lip 15 and of the projection 14 are slightly less than the inside diameter of the conduit 10. By virtue of this construction the float 11 may only touch the interior of the conduit 10 at two places, i.e., the lip 15 and the projection 14 thus minimizing friction. Further, the projection 14 at the lower extremity of the float 11 provides a pendulous effect which in conjunction with the fluid flow tends to center the float 11 within the conduit 10 in order that the float 11 actually does not contact the conduit 10 thereby substantially eliminating friction. By having the bore of the conduit 10 and the float 11 highly polished, adhesion between the float 11, the fluid and the conduit 10 is minimized. The float 11 is non-wettable, corrosion-resistant and free from undesirable resistance to flow. The float 11 can be made of any suitable magnetic material; stainless steel is particularly suitable since it resists corrosion otherwise caused by the saline blood.

A magnetic biasing means in the form of an electromagnet 20 is disposed adjacent the conduit 10 with its windings 21 completely surrounding the conduit 10. As shown in FIG. 2, the windings 21 are connected to a regulated D.C. power source 22. With the direction of fluid flow downward as indicated by the arrow, the windings 21 are supplied with a sufficient amount of current from the source 22 by means of a control knob 23 to provide the amount of magnetic bias necessary to neutrally suspend the float 11 against the force of a predetermined fluid flow rate and the force of gravity in the proper relationship to a pick-off assembly 24 in a manner to be more fully described. The current flow through the windings 21 is in a direction to create a magnetic flux field 25 that is cooperative with the float 11 to maintain the float 11 in the aforementioned predetermined position. Preferably, the current from the source 22 is closely regulated to maintain a constant bias for a particular setting of the knob 23 in spite of changes tending to be caused by variations in ambient air temperature, fluid temperature, etc.

The pick-off 24 is disposed in vertical spaced relation to the electromagnet 20 adjacent to and surrounding the conduit 10. The pick-off 24 is cooperative with the projection 14 and responsive to the movement of the float 11 for providing a signal representative of the float movement. Preferably, the pick-off 24 is an electrical circular E-transformer type having an excitation winding 30 mounted on its central stator portion and output windings 31 and 32 mounted on its upper and lower stator portions as viewed in the drawings. The excitation winding 30 is connected to an A.C. excitation source 33 of, for example, 400 cycles. The frequency of the source 33 is held to close tolerances, for example, less than ±1% variation. The output windings 31 and 32 are connected in series opposition with respect to each other and provide an electrical signal having an amplitude representative of the rate of flow of the fluid through the conduit 10 in a manner to be more fully described. The output windings 31 and 32 are connected to a vacuum tube voltmeter 34 having a zero adjustment arrangement. The voltmeter 34 is connected to a flow indicator 35 to provide a visual indication of the rate of fluid flow. The output windings 31 and 32 may also be connected to provide a flow rate control signal to a fluid flow control apparatus 37 to control the flow rate of the fluid.

The projection 14 of the float 11 acts as an armature for the pick-off 24 and is cooperative with the upper extremity of a magnetic flux field 36 created by the pick-off 24. By this arrangement the float 11 only partially enters the flux field 36 of the pick-off 24 thereby minimizing the weight of the float 11. It will be noted that in the no-flow condition with the float 11 partially entering the flux field 36 there would normally be an output shown on the flow indicator 35. This residual output is eliminated by the zero adjustment control within the vacuum tube voltmeter 34. One approach could be, for example, to alter the balance of a differential amplifier located with the vacuum tube voltmeter 34. This approach is desirable because it makes the instrument more sensitive to the slightest movement of the float 11. The fluid flow control apparatus 37 could be similarly adjusted to compensate for the undesired residual output or the apparatus 37 may be connected to the output of the voltmeter 34.

The electromagnet 20 and the pick-off 24 are mounted on adjustable hangers 40 and 41 respectively for ease in properly spacing the assemblies 20 and 24 with respect to each other and the float 11. The hangers 40 and 41 are adjustable in a vertical direction by means of hanger clamps 42 and 43 respectively which cooperate with a vertical support plate 44. Preferably, the coils 21 are protected by a cover 45.

In order to render the apparatus particularly adaptable for the measurement of blood and for purposes of ease of disassembly for cleaning, it includes a hose barb 50 of non-magnetic stainless steel for connecting the instrument to flexible tubing not shown. The hose barb 50 also positions, holds and connects to the conduit 10. The hose barb 50 is positioned and held in place by a barb adjusting screw 51. A neoprene O-ring 52 seals the conduit 10 to the hose barb 50 while a Teflon ring 53 compresses the O-ring 52 around the conduit 10 to effect a seal when force is exerted upon it by a ring nut 54. A similar arrangement to that described above, supports the other end of the conduit 10. Adjusting screws 51, 51 are mounted on upper and lower hangers 55, 55 respectively, which in turn are connected to the vertical plate 44. The vertical plate 44 is mounted on the supporting base 56. The base 56 is provided with a plurality of levelling devices 57. A second vertical plate 60 may also be mounted on the base 56 and connected to the plate 44 to provide additional rigidity for the apparatus and to provide means to which the electrical leads 61 may be mounted.

In order to prevent the float 11 from falling beyond the effective magnetic field of the electromagnet 20 and also to cushion the conduit 10 and prevent chipping thereof, Teflon tube bushings 62 and 63 may be mounted within the upper and lower bore of the conduit 10.

In operation, the electromagnet 20 and the pick-off 24 are adjustably positioned vertically to the proper locations and the levelling devices 57 are adjusted to support the conduit 10 vertically in order to minimize the friction between the float 11 and the conduit 10. Depending upon the range of fluid flow rates to be measured, the control knob 23 is adjusted to provide current that produces sufficient magnetic flux 25 to bias the float 11 against the force of gravity and the force of a predetermined flow rate. Below the predetermined flow rate, there is no deflection of the flow indicator 35.

As the flow rate increases above the predetermined flow rate, the float 11 is driven downward in proportion to the fluid flow rate. The displacement of the float 11 changes the flux density of the magnetic field 36 at the upper portion of the pick-off coil 31. This unbalanced flux change produces an electrical signal in the form of a voltage which is proportional to the displacement of the float 11 and thus the rate of flow. This signal is applied to the vacuum tube voltmeter 34 and an indication of the flow rate is provided on the flow indicator 35. The flow rate signal is also applied as a control signal to the fluid flow control apparatus 37 which controls the fluid flow in accordance with the control signal to provide a predetermined flow rate. When the flow rate returns to the predetermined flow rate, the magnetic bias provided by the electromagnet 20 returns the float 11 to its predetermined position.

The range of flow rates which can be measured and controlled by the present invention is determined by the type of fluid to be measured, the diameter of the bore of the float 11, and the bias provided by the electromagnet 20. The magnetic bias provided by the electromagnet 20 is varied by means of the control knob 23 in order that a range of flow rates from very small to relatively large may be measured by simply varying the magnetic biasing. This results in a multi-range instrument having a float travel that is limited to a fraction of an inch thereby providing extreme sensitivity and accuracy. The sensitivity of the measurement is a function, among other things, of the taper of the bore of the float 11; generally, increasing the taper increases the sensitivity. Although the bore of the float 11 has been described as tapered for only a portion thereof, it may be tapered for its full length.

In order to minimize friction between the float 11 and the conduit 10, the apparatus has been described as disposed vertically. It will be apparent however that it is also operative when disposed horizontally and in this condition, the bias provided by the electromagnet 20 need only be that required to overcome a predetermined flow rate.

While the invention has been described in its preferred embodiments, it is to be understood that the words which have been used are words of description rather than of limitation and that changes within the purview of the appended claim may be made without departing from the true scope and spirit of the invention in its broader aspects, for example, the float 11 may be suspended by other than electrical means and the pick-off 24 may be optical rather than electrical.

What is claimed is:

Fluid flow responsive apparatus comprising a non-magnetic electrically non-conductive conduit through which the fluid to be measured flows, a hollow tubular magnetic float positionably disposed for vertical movement within said conduit and responsive to the fluid flow, said float having a tapered portion whereby the force due to the fluid flow acts on the tapered portion causing displacement of said float proportional to the flow rate, said float further having upper and lower projecting portions having an outside diameter slightly less than the inside diameter of said conduit, the lower portion of said float being slightly pendulous, magnetic biasing means disposed adjacent said conduit and cooperative with said float for maintaining said float neutrally suspended in said fluid against the force of a predetermined fluid flow rate and the force of gravity, said magnetic field, pendulosity and fluid flow all tending to maintain said float centered with respect to said conduit thereby substantially eliminating friction between said float and said conduit, electrical pick-off means disposed adjacent said conduit and cooperative with the lower portion of said float and responsive to the movement of said float for providing a signal representative of said movement, said pick-off means providing a magnetic flux field, said lower portion of said float acting as an armature of said pick-off means, and indicating means responsive to said signal for providing an indication of the rate of flow of said fluid.

References Cited in the file of this patent

UNITED STATES PATENTS

| | | |
|---|---|---|
| 2,364,930 | Turner | Dec. 12, 1944 |
| 2,487,083 | Warshaw | Nov. 8, 1949 |
| 2,557,072 | Brewer | June 19, 1951 |
| 2,571,863 | Godsey | Oct. 16, 1951 |
| 2,624,360 | Goddard | Jan. 6, 1953 |
| 2,769,337 | Rich | Nov. 6, 1956 |
| 2,816,570 | Coulbourn et al. | Dec. 17, 1957 |
| 2,936,614 | Godbey | May 17, 1960 |